Aug. 14, 1956  J. W. PALM  2,758,691
CLUTCH-OVERCENTER LEVER ADJUSTING DEVICE
Filed Dec. 6, 1952   2 Sheets-Sheet 1
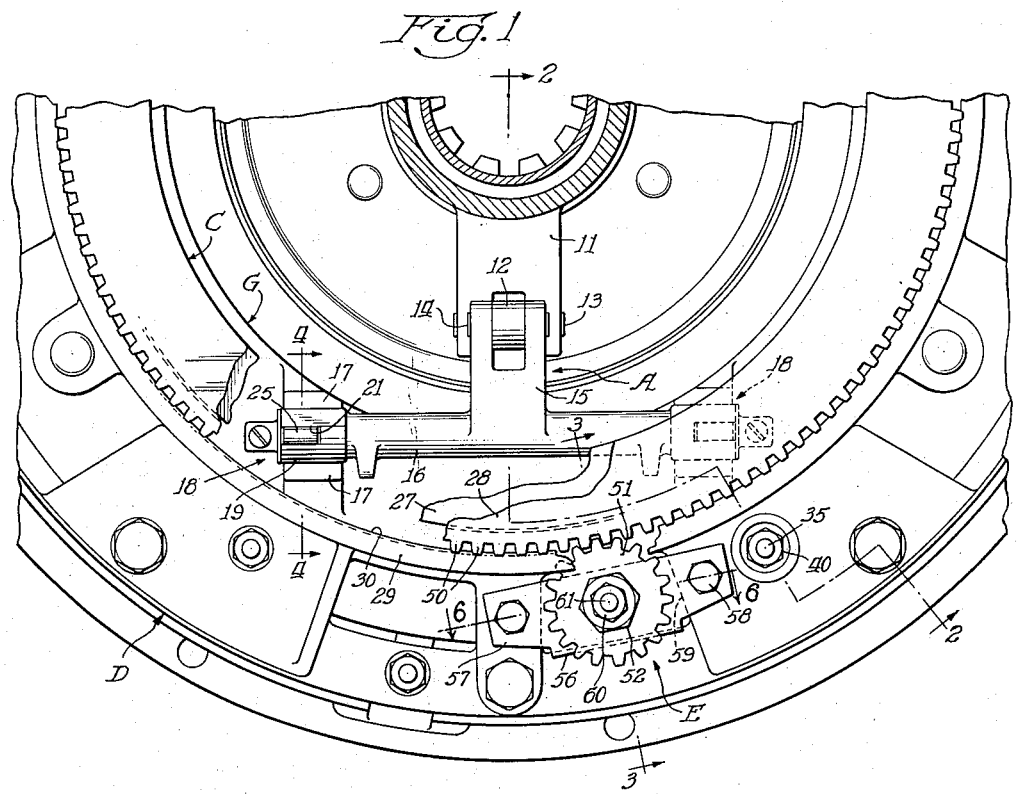
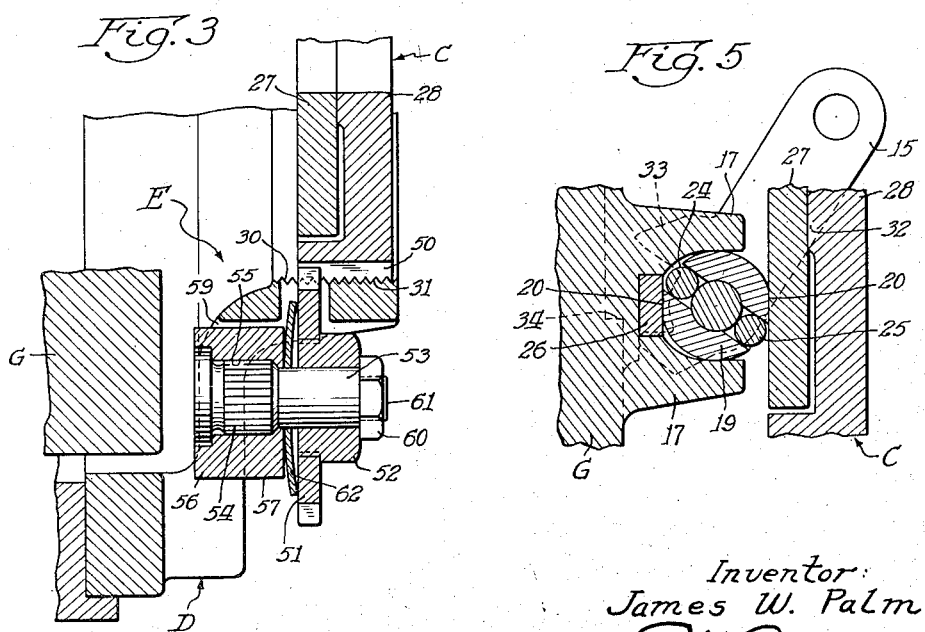
Inventor:
James W. Palm
By: E. K. Lundy
Atty.

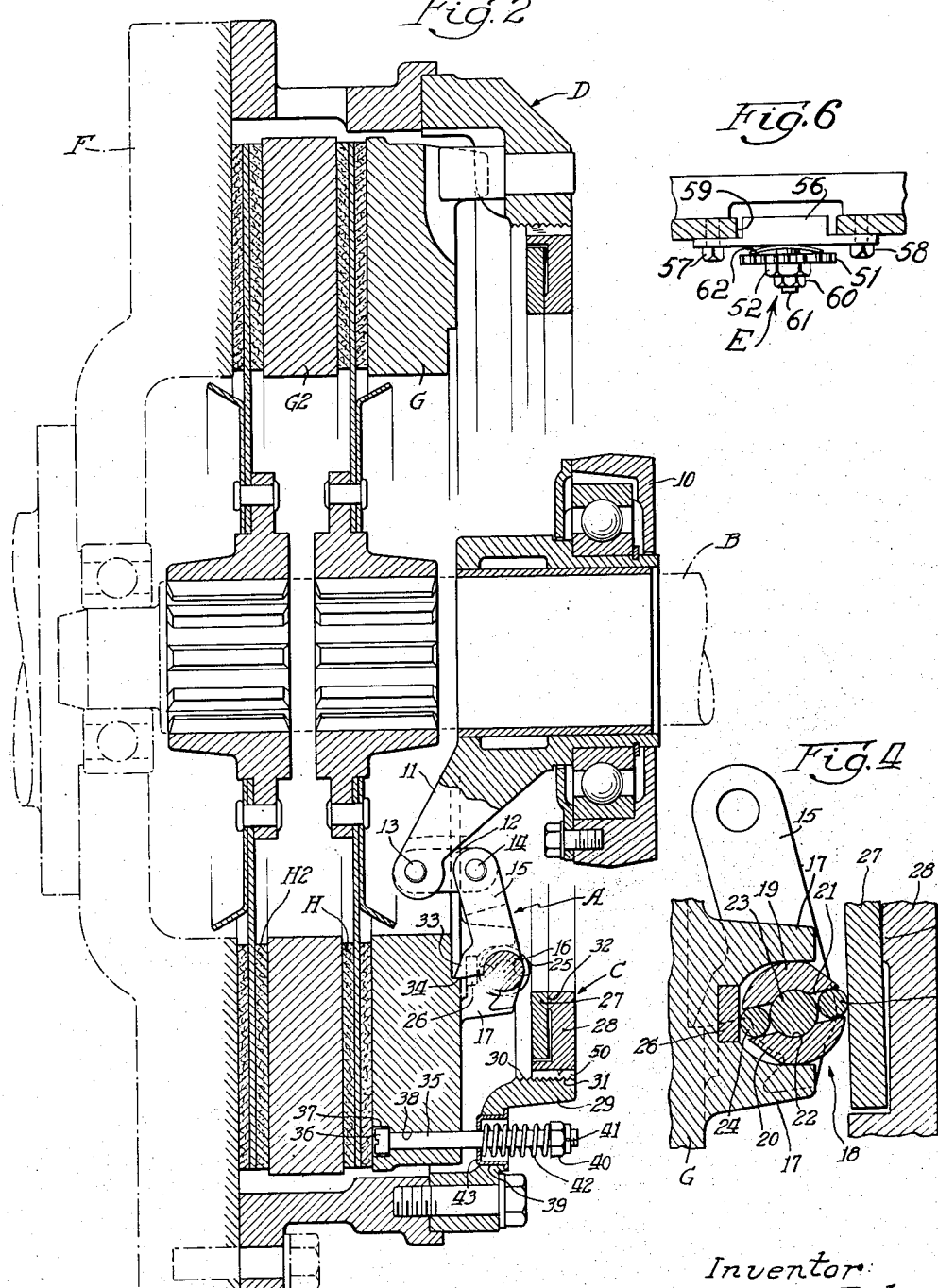

United States Patent Office 2,758,691
Patented Aug. 14, 1956

2,758,691

CLUTCH-OVERCENTER LEVER ADJUSTING DEVICE

James W. Palm, Rockford, Ill., assignor to Borg-Warner Corporation, Chicago, Ill., a corporation of Illinois Application December 6, 1952, Serial No. 324,493

3 Claims. (Cl. 192—111)

The present invention, considered in its broadest aspect, relates to an adjusting device for effecting relative axial movement between two rotatable elements, said adjustment being effected by means of a rotatable member mounted on one of the elements and having operative engagement with the second of said elements, the said elements being cooperatively connected to each other by threads which act in the manner of a cam to effect bodily axial movement of the second element when the latter element is rotated.

More particularly the present invention relates to an improvement in clutch assemblies wherein there is a back plate or ring having threaded engagement with the clutch cover or other driving element and is acted on by clutch operating devices, and said back ring is adapted to be rotated in the cover by means of an adjusting device mounted on the cover and geared in suitable manner to the ring. The advantage of an arrangement of this character is that whenever wear takes place between the clutch elements and the clutch operating means the ring may be adjustably moved in an axial direction to accommodate the clutch assembly to this wear.

In clutch assemblies, particularly those of the friction type, wear occurs on the work face of the pressure plate and on the surfaces of the friction facings which are contacted by the flywheel and pressure plate, and this wear is such that it affects the travel of the clutch engaging devices. This is objectionable for the reason that when toggle devices or overcenter linkage are employed for engaging the clutch elements, the looseness resulting from wear prevents locking of the toggles in proper overcenter positions because of insufficient travel of the links.

It is a primary object of the present invention to provide an adjusting device for axially moving a pair of rotatable elements threaded to each other and to perform this function by means of a rotatable member carried by one element and operating against the second element thereby to rotate said second element independently of the first element thereby to effect axial adjustment between the elements.

The present improvements are adapted for use in several types of mechanical combinations wherein frequent coupling and uncoupling of the driving and driven elements generates friction resulting in wear on the parts to such an extent that the devices which effect the coupling of the elements fail to operate in a satisfactory manner. This is noticeable in power transmission mechanisms, and particularly in clutch assemblies which are installed in motor vehicles between the engine crankshaft and the transmission shaft. In certain types of friction clutches, the devices which effect engagement of the driving and driven elements may take the form of overcenter linkage or articulated levers acting between the rotatable clutch pressure plate and an annular plate or ring which is carried by a clutch cover or a bracket member in which said ring is mounted for axial adjustment with respect to said bracket member. Heretofore means have been provided for accommodating the clutch parts to wear which occurs between the driving and driven elements, but many of these prior devices are objectionable for the reason that special tools are usually required for performing the adjusting operation and as a consequence should this special tool be mislaid the adjustment will become a difficult operation. In the present instance the improved devices for adjusting the clutch elements require nothing more than an ordinary wrench which is always available at a repair or service station.

It is, therefore, another primary object of the present improvements to provide a clutch assembly wherein one of the rotatable elements provides support for a back ring having threaded engagement therewith for independent rotative movement with respect to support for adjusting the ring bodily in an axial direction toward the clutch pressure plate. This ring adjustment is readily effected through the medium of a collar rotatably mounted on the clutch cover or bracket member and having a splined or toothed engagement with said ring.

In connection with the foregoing objects, one of the novel features of this assembly resides in the particular construction and arrangement of the ring and its adjusting device which is defined by a rotatable collar journaled on the support and has a toothed periphery meshing with teeth on the ring, and the latter teeth have threads on their outer tips which engage the threaded parts of the cover or other driving element on which the ring is mounted.

Another object hereof is to provide a clutch assembly wherein the clutch engaging members act between the pressure plate and an axially adjustable back ring which is threaded to a driving member and adapted to be rotated by a rotatable gear member which is splined to the outer margin or periphery of the ring, and after the adjusting operation has been effected the collar may be locked against inadvertent operation.

Another object resides in providing an adjusting device of the character herein disclosed which comprises a unitary assembly having means whereby the adjusting device may be readily incorporated at a prescribed location in the clutch thereby facilitating easy replacement or repair.

Another object of the present invention is to simplify the construction and operation of an adjusting device for clutches or other couplings, and to improve the efficiency of said device.

Further objects, aims and advantages of the present improvements will be apparent to persons skilled in the art after the construction and operation of the adjusting device and coupling are understood from the within description.

It is preferred to accomplish the numerous objects of the invention herein disclosed and to practice the same in substantially the manner hereinafter fully described and as more particularly pointed out in the appended claims. Reference is now made to the accompanying drawings which form a part of this specification, in which:

Fig. 1 is a fragmentary elevational view looking at the rear side of the lower half of a clutch assembly in which the present improvements are incorporated;

Fig. 2 is a sectional view taken along the plane of line 2—2 on Fig. 1 looking in the direction of the arrows;

Fig. 3 is an enlarged sectional view of the improved adjusting assembly, taken along the plane of line 3—3 on Fig. 1 and looking in the direction of the arrows;

Fig. 4 is an enlarged sectional view of a clutch operator cam assembly shown in clutch-engaged position, the view being taken along the plane of line 4—4 on Fig. 1 and looking in the direction of the arrows;

Fig. 5 is a sectional view similar to Fig. 4 and showing the relative positions of the parts when the clutch has been released or disengaged; and Fig. 6 is a sectional view taken along the plane of line 6—6 on Fig. 1 and looking in the direction of the arrows.

The drawings are to be understood as being more or less of a diagrammatic character as they are merely for the purpose of disclosing a typical or preferred embodiment of the improvements contemplated herein. In these drawings like reference characters identify the same parts in the different views.

The drawing is illustrative of a typical torque transmitting or coupling assembly showing the present improvements incorporated therein. In the structure shown, rotatable drive and driven elements are connected respectively to drive and driven shafts and are adapted for axial movement relative to each other to effect coupling engagement by means of suitable lever devices. One of these rotatable elements carries a separate ring or back plate which is adapted to be bodily moved axially of said element by means of a novel adjusting assembly which is carried by a second of said elements, whereby desired axial adjustment of the first element with respect to the other parts of the clutch may be readily made for the purpose of taking up any wear which may have occurred on the coupling parts which would affect the proper travel of the lever devices for coupling the drive and driven elements.

Briefly described, the structure exemplified in the drawings has been shown as a portion of a friction clutch and generally comprises a rotatable driving member or flywheel F that is secured to an engine crankshaft (not shown) and is drivingly connected to a clutch pressure plate G that is shiftable axially by the clutch operating or actuator assembly A suitably carried on the driven shaft B to act between the pressure plate and a back plate or ring assembly C. A cover or bracket member D which is secured to the flywheel F provides a support for this back plate or ring assembly C, and the adjusting devices E for equalizing the actuator cam assembly A to take up wear which occurs on the clutch parts are mounted on the housing or bracket member D. When the actuator cam assembly A is operated in a direction to engage the clutch, the friction plate or disc H will be clamped between the pressure plate G and the flywheel F, thereby to transmit torque from the engine crankshaft to the driven shaft B. In certain installations which may be desirable, or required, to provide an auxiliary or second pressure plate G2 between the friction disc H and an auxiliary or second friction disc H2 on the driven shaft forwardly of the disc H, said auxiliary elements being adapted to be clamped to the flywheel when the primary pressure plate G has been shifted into clutch engaging position by means of the actuator assembly A. As a result, all of the clutch parts will then have conjoint rotative movement and the torque from the flywheel F is transmitted through the clutch assembly to the driven shaft B.

The actuator cam assembly A is generally similar to the arrangement shown in Ruesenberg et al. Patent No. 2,129,361, dated September 6, 1938, for a Friction Clutch. This assembly, as herein shown, comprises the shift bearing or sleeve 10 movable axially on the driven shaft B and has radial arms 11 the outer extremities of which receive one end of the link 12 pivotally connected thereto by the pin 13, the opposite end of the link being pivotally connected by the pin 14 to the adjacent end of a lever arm 15 which projects from an intermediate portion of a rock bar 16. The ends of rock bar 16 are journaled in bearing lugs or saddles 17 on the pressure plate G to permit limited rotation of said bar, and the end regions of the bar are provided with cams 18 which are movable to overcenter positions to lock the clutch when engaged. These cams 18 comprise cylindrical portions 19 of the rock bar 16 on the outer surfaces of which are diametrically located flattened regions 20, and where these flattened portions merge with the cylindrical surfaces of the cams there are radial slots 21 which are joined by a central aperture 22. A roller 23 is carried in the aperture 22 to freely rotate therein and smaller rollers 24 and 25 are positioned in the radial slots adjacent the central roller and also freely rotate in said slots. It will be seen that the overall dimensions of the three rollers 23, 24 and 25, measuring from the outer circumferences of the small rollers are at least equal to the diameter of the cylinder 19 and preferably are slightly larger.

There is a hardened metal insert 26 seated in the inner portions of the bearings or saddles 17 for cooperation with the roller 24. Suitable means are provided (not shown) for retaining the rollers in proper positions in the cylindrical cam members to prevent dislodgment of said rollers. The roller 25 is positioned in a manner so that when the actuator assembly is operated this roller 25 will contact the surface of a spring ring 27 made of spring steel or the like carried in an adjusting ring 28 which is mounted on the clutch cover assembly D. The rear section of the cover assembly D has an annular axially extending flange 29, the internal surface of which is provided with threads 30 which are engaged by threads 31 on the outer surface of the adjusting ring 28. By rotating the adjusting ring 28, the spring ring 27 will be shifted axially toward the pressure plate and will thereby take up any wear that may have occurred. An annular shoulder or boss 32 on the face of adjusting ring 28 next to the spring ring 27 provides a fulcrum at the inner annular region of said spring ring. The cams act against the outer annular region of this spring ring 27 and yieldably distort said ring into a frustum-conic shape in cross section, as shown in Fig. 4.

In operating the clutch, rotation of a cam 18 in one direction is limited by the reduced or flat regions 20 thereof, and reverse rotation is limited by a nose or lug 33 (Fig. 1) on lever 15, which engages a stop shoulder 34 on the rear portion of pressure plate G. Nose or lug 33 is so located, however, that it permits cam 18 to be rotated slightly beyond the point at which the line of pressure on rollers 24 and 25 passes through the center of the cam, thereby generating a couple which tends to assist the rotation in the said reverse direction.

When the actuator cam assembly A is moved to a position to release the clutch the pressure plate G is freed from friction disc H. In order to insure this release means are provided to rearwardly move the pressure plate G away from the friction disc. The means just mentioned may comprise a bolt 35 the head 36 of which is seated in a socket 37 in the outer peripheral region of the pressure plate, and the shank of this bolt passes through an axially extending bore 38 leading rearwardly from socket 37. The protruding portion of bolt 35 passes rearwardly through an aligned aperture 39 in a radial rear section of cover or bracket D and has its outer end threaded to receive a nut 40 and lock washer 41. A coiled expansion spring 42 surrounds the bolt 35 between nut 40 and a flanged cup 43 seated in cover aperture 39. It will be seen that the spring 42 acting on the bolt 35 will pull the pressure plate G rearwardly away from the clutch disc H when the actuator cam assembly has been moved to a position to release the clutch.

The adjusting assembly E shown in sectional detail in Fig. 3 comprises rotatable means carried by the cover or bracket member and having a driving connection with the adjusting ring 28 whereby said ring may be rotated with the result that the threaded engagement between the ring and the cover flange will function in the manner of a cam thereby to bodily shift said adjusting ring 28 together with the spring ring 27 in an axial direction to compensate the clutch actuator assembly A to any wear which may have taken place in the various clutch elements. This will permit the correct travel of the toggles and actuator assembly A to insure that the overcenter movement of the levers will effectively cause engagement of the pressure plate G and driven disc H in a single clutch, and also including the pressure plate G2 and driven disc H2 when the clutch is of a multiple plate type or double clutch.

In order to perform this function of rotating the back plate or adjusting ring 28, said ring has its peripheral edge provided with radial teeth or splines 50 upon the tips of which the screw threads 31 are formed. A pinion or small gear 51, fixed on or formed integral with a rotatable collar 52, is meshed with the ring splines 50 in the same manner as a gear and pinion intermesh. Preferably, said collar 52 is rotatably carried on the smooth circumferential region of an axially extending pin 53 having a serrated head region 54 which is secured by a press fit in the bore 55 of a cylindrical boss 56 formed on the back face of an elongated attaching plate 57 and received within a socket embossment of the bracket member D, as shown in Figs. 3 and 6, said plate 57 being suitably anchored, as by bolts 58, to a convenient portion of the rear face of the cover or bracket member D which is recessed or apertured as at 59 to receive the boss 56.

For the purpose of facilitating rotation of collar 52 and its pinion 51 to axially adjust the ring, said collar is preferably made with a hexagonal or other angular contour to receive an ordinary wrench or similar tool whereby said collar and pinion may be manually rotated for turning the adjusting ring 28 in the housing threads 30. The collar 52 is retained on the pin 53 by a nut 60 screwed on the threaded outer end region 61 of said pin, and a Belleville spring washer 62 is interposed between the outer end surface of the mounting boss 56 and the opposing face of pinion 51. This arrangement provides a definite frictional lock which prevents unintentional rotation of the adjusting pinion 51 when the nut 50 has been tightened in place following a ring adjusting operation.

While this invention has been described in detail in its present preferred form or embodiment, it will be apparent to persons skilled in the art, after understanding the construction, operation and functions of the improvements contemplated herein, that various changes and modifications may be made therein without departing from the spirit or scope thereof. It is aimed in the appended claims to cover all such changes and modifications.

What is claimed is:

1. In a clutch which comprises driving and driven members; a shiftable pressure plate for effecting engagement between said members; annular bracket means carried by said driving member rearward of said pressure plate, said bracket means having internal threads and having an opening at its radially outer region; a ring rotatably carried by said bracket means; and splines on the outer periphery of said ring having threads on their tips engaged with said bracket threads whereby axial adjustment of said ring is effected by rotation thereof; those improvements which comprise a supporting plate secured to said bracket means in bridging relation to said opening; a cylindrical boss on said supporting plate positioned in said opening; a stud protruding in an axial direction from said boss; a pinion rotatable on said stud with its teeth meshed with said ring splines, whereby rotation of said pinion is effective to bodily shift said ring in an axial direction with respect to said driving and driven members; and means for locking said pinion in any of its adjusted positions.

2. In a friction clutch, driving and driven clutch members, an annular backplate having external threads and splines and which is axially adjustable with respect to the clutch actuating means for effecting engagement of the driving and driven clutch members; bracket means carried by the clutch driving member and having thereon internal threads engaged with the backplate threads; a socket embossment on said bracket means; a supporting plate having a cylindrical boss mounted in said socket of said embossment; and a pinion rotatably carried by said boss with its teeth in mesh with said backplate splines, the aforesaid arrangement being such that rotation of said pinion is effective to axially turn said backplate, whereby through the threaded connection with said bracket means is effective to bodily move said backplate in an axial direction with respect to the clutch operating means.

3. In a friction clutch as defined in claim 2, wherein the bracket means is defined by an annulus; and including a pin on said boss rotatably carrying said pinion, and means on the pin for locking the pinion against rotation and thereby maintain the annular backplate in adjusted positions.

References Cited in the file of this patent
UNITED STATES PATENTS

| | | |
|---|---|---|
| 426,567 | Leverich | Apr. 29, 1890 |
| 1,063,998 | Morse | June 10, 1913 |
| 1,402,129 | Wood | Jan. 3, 1922 |
| 1,791,016 | Sundh | Feb. 3, 1931 |
| 2,129,361 | Ruesenberg et al. | Sept. 6, 1938 |
| 2,280,355 | Spase et al. | Apr. 21, 1942 |
| 2,345,244 | Eason | Mar. 28, 1944 |